United States Patent

[11] 3,633,602

| [72] | Inventor | George W. Schossow<br>2316 Lilac Lane, White Bear Lake, Minn. 55110 |
|---|---|---|
| [21] | Appl. No. | 25,986 |
| [22] | Filed | Apr. 6, 1970 |
| [45] | Patented | Jan. 11, 1972 |

[54] CONTROLLED MIXING VALVE
8 Claims, 5 Drawing Figs.

[52] U.S. Cl............................................... 137/81,
137/557, 137/607, 137/625.4, 137/637.4
[51] Int. Cl............................................... F16k 19/00
[50] Field of Search............................................... 137/100,
114, 604, 606, 607, 81, 625.4, 625.41, 637.4

[56] References Cited
UNITED STATES PATENTS

| 1,404,211 | 1/1922 | McKee | 137/625.41 X |
| 2,893,429 | 7/1959 | Schaffer | 137/625.41 |
| 3,089,505 | 5/1963 | Forster | 137/625.41 X |

FOREIGN PATENTS

| 478,673 | 2/1953 | Italy | 137/625.41 |

*Primary Examiner*—Robert G. Nilson
*Attorney*—John C. Barnes

ABSTRACT: A mixing valve for gaseous fluids wherein the fluids are introduced into separate chambers, the pressure of the fluids in each chamber is equalized because of a gravity biased balancing cover in the chamber to open the chamber or chambers to the ambient atmosphere in the event the pressure inside a chamber exceeds or falls below the ambient pressure. A blower is utilized to draw the fluids from said chambers through exit openings proportioned to the desired percentage of each fluid to be mixed by and expelled from said blower.

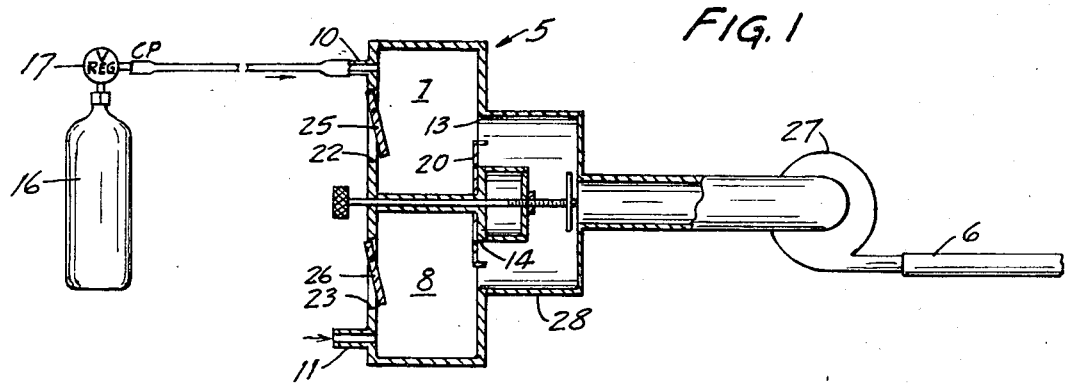
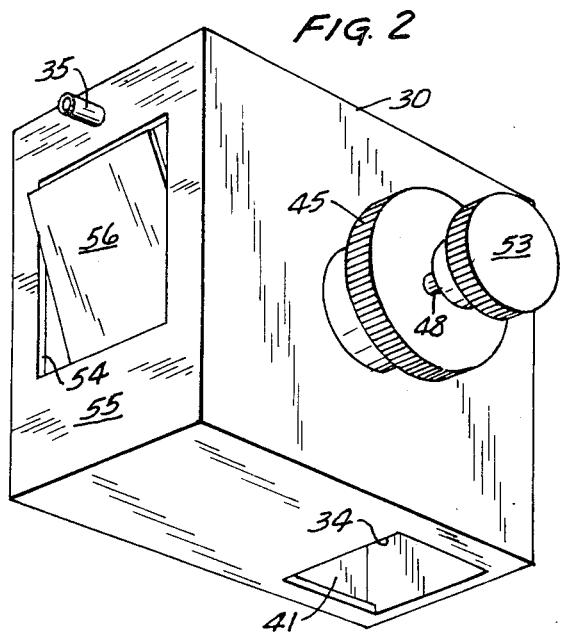
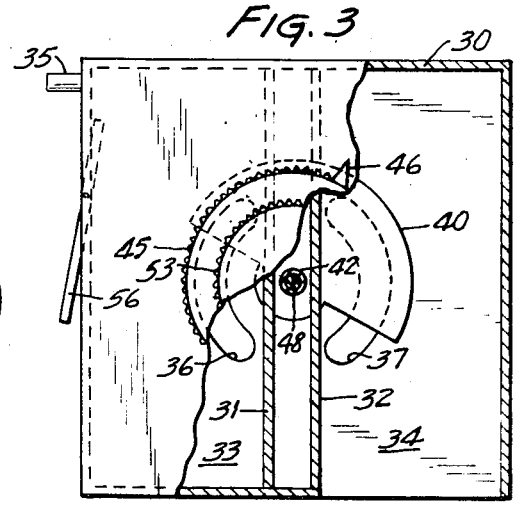
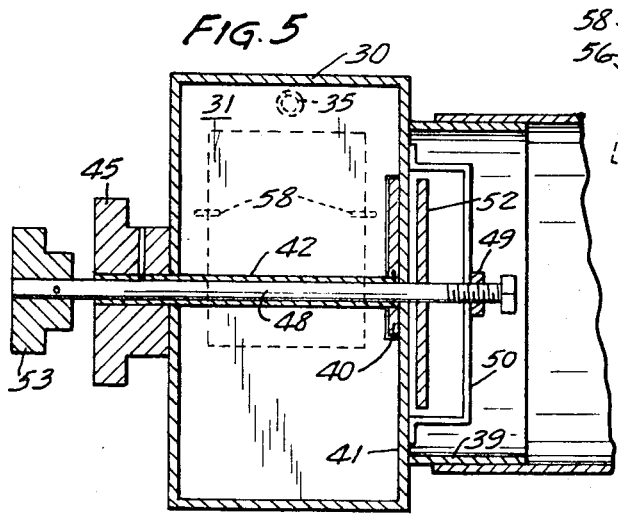
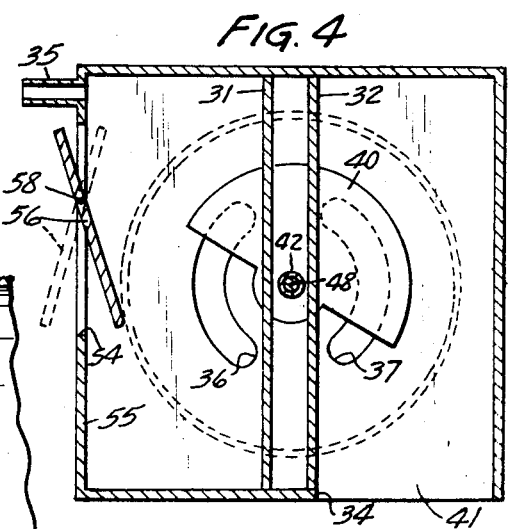
INVENTOR.
GEORGE W. SCHOSSOW
BY John C. Barnes
ATTORNEY

CONTROLLED MIXING VALVE

This invention relates to an improved valve structure and in one aspect to an improved mixing valve for gaseous fluids.

The prior art in mixing valves is directed toward liquids more than gases and the mixing valves for gases are dependent upon pressures of the gases and restrictive passages. The present invention is directed toward a simplified valve where again the mixing is dependent on pressure but pressures near atmospheric. Restrictive passages are also utilized in the valve of this invention but the amount of the gaseous fluid passing therethrough from the chambers at ambient pressure is in response to the subatmospheric pressure on the down channel side of the passages or openings and not on the pressure within the chambers.

The valve of the present invention provides for the mixing of several gases in predetermined proportions by drawing the gases from chambers containing said gases under equal pressures. The gases are withdrawn through exit openings in the chambers by the existence of at least a subatmospheric, partially evacuated or lower pressure condition existing on the side of the exit openings opposite the chamber.

The valve comprises a plurality of equal chambers each having means for permitting a gas to enter the chamber. Each chamber is also formed with an exit opening of equal area to exit opening of the other chambers. A closure member adapted to fit over an exit opening and move with a closure member of another exit opening affords controlled proportionate mixing of the gases. The pressure of the gas within each chamber is measured by the ambient atmospheric pressure by a valve or cover in the chamber walls which indicates and controls the pressure within the chamber. Since the ambient gas is usually one of the gases to be mixed, one valve chamber may be open to the ambient air or gas.

The above advantages of the present invention and further features and details of the invention will be more fully understood after reading the following description which refers to the accompanying drawings wherein:

FIG. 1 is a schematic view of a valve constructed in accordance with the present invention in a system for mixing two gases and discharging the mixture to a prescribed line;

FIG. 2 is a perspective view of the valve constructed in accordance with the present invention showing the front, right side, and bottom thereof;

FIG. 3 is a front elevational view partly broken away to illustrate the parts located interiorly;

FIG. 4 is a vertical sectional view showing the valve constructed in accordance with the present invention with parts broken away for purpose of illustration; and FIG. 5 is a vertical transverse sectional view of the valve of FIGS. 2 through 4.

Referring now to the drawings, the valve 5 is designed for mixing two gases in a desired proportion to be discharged into a room or forced through some other exit conduit such as the conduit 6 forming a discharge line. The valve 5 comprises a plurality of equal chambers each adapted to contain a gaseous fluid. As illustrated, there are two chambers 7 and 8 which are generally enclosed by wall members and septum and formed with means defining inlet openings 10 and 11 respectively. Each chamber is also formed with an exit opening 13 and 14, which exit openings are identical in area. The gas may be introduced into the chambers from a suitable source of the desired gas such as from a pressurized vessel 16 upon which may be mounted a constant pressure outlet valve 17, discharging the gas into the chamber 7 of the valve 5 as through the inlet opening 10.

The proportion of the gas from each chamber 7 and 8 is regulated by the position of a closure member 20 which is slidable across the exit openings 13 and 14 to fully close one opening and simultaneously completely uncover the other opening or to be moved across the openings to proportionately vary the relative open area of each of the exit openings 13 and 14. The closure member 20 may be controlled by reciprocal movement or may actually be independent vanes linked together to move in a constant relative relationship over the openings.

Means are provided in this valve for balancing the pressure of the gaseous fluid within each of the chambers such that the pressure therein is equal to the ambient pressure surrounding the valve. To accomplish this result openings 22 and 23 are provided in the wall of the chambers 7 and 8 respectively. Within these openings and positioned for covering the openings are covers 25 and 26 respectively, which covers are freely pivotally mounted and formed to fit with a close tolerance in the openings 22 and 23. When the pressure within a chamber exceeds the ambient pressure the cover swings outward from the chamber allowing the escape of sufficient gas to maintain the constant pressure inside equal to atmospheric or ambient and upon the pressure within the vessel becoming lower than the atmospheric or ambient pressure the cover member swings inward from its position in the wall of the chamber allowing ambient air or gas to enter the valve to equalize the pressure. Thus the position of the cover indicates the relative pressure within the chamber and valves directing the gas into the chamber may be adjusted until each cover reaches the position closing the opening in the chamber wall.

As illustrated in FIG. 1 the pressure from regulating valve 17 is adjusted to match the atmospheric pressure and the pressure in chamber 8 matches the atmospheric pressure because the cover is swung inward allowing ambient air to enter the chamber. In this position the valve 5 may be used to mix a gas such as oxygen in a pressurized vessel 16 with room air entering chamber 8. The oxygen and air are then drawn through the exit openings 13 and 14 under the force of a suitable pump such as the centrifugal pump 27. This pump 27 then mixes the air from each of the chambers and discharges it through the outlet conduit 6. Variation in the proportion of the oxygen to be mixed with the air can be accomplished by changing the position of the closure member 20 relative to the exit openings 13 and 14.

A manifold 28 is formed to fit the rear wall of the valve 5 and surround the exit openings 13 and 14. As illustrated the manifold 28 and valve 5 are also provided with a damper 29 which is controlled by an adjustable rod through rotation or movement of a knob 24. The damper 29 serves to restrict or block the movement of the gases out of the manifold and in this way the volume of mixed has delivered to the suction side of the pump 27 or whatever may be on the exit side of the manifold 28 is controlled. Other means of controlling flow however exist, such for example as the variable speed of the blower.

Referring now to FIGS. 2 through 5 it is noted that the valve 30 comprises a valve housing of generally rectangular configuration. The valve housing 30 is divided by a transversely extending partition walls 31 and 32 into two equal chambers 33 and 34. The chamber 33 is formed with a coupling 35 defining the inlet opening into the upper portion of the chamber 33. The inlet to chamber 34 is determined by the open bottom of the chamber over which may be positioned a suitable filter cloth or screen (not shown).

In each of the chambers is formed a generally bicorn opening 36 and 37 respectively, which are identical in size and open area. A suitable manifold 39 or coupler which may lead to the inlet side of a pump or other apparatus is fitted on the rear wall of the valve housing to surround and communicate with both of the openings 36 and 37. The adjustable closure member 40 of this embodiment is a semicircular disc which is positioned in sealing engagement with the rear wall 41 of the valve body and seals with the rear edges of the partitions 31 and 32. The closure 40 is connected to and rotatable with a hollow sleeve 42, in the illustrated embodiment, which sleeve extends transversely of the valve body and is connected on the front surface of the valve body to a knob 45. The knob 45 may have an indicator 46 to identify the position of the closure 40 or to indicate by indicia on the valve body the relative amounts of the gases which will be mixed.

Extending through the valve body, knob 45, sleeve 42 and closure 40 is a rotatable threaded rod 48. The rod 48 is threaded in a nut 49 affixed to a bracket 50 supported in spaced relation from the rear wall 41 of the valve body.

Secured to the rod 48 and movable to a position against the wall 41 and of a size to cover the exit openings 36 and 37 is a disc-shaped damper 52. This damper is adjustable in the coupling 34 to vary the amount of gas which can be withdrawn from the chambers 33 and 34. A knob 53 permits rotation of the rod 48 and adjustment of the damper 52.

The chamber 33 is formed with an opening 54 in the chamber wall 55. In this opening 54 is positioned a cover 56 which fits very closely within the opening and is freely pivotally mounted therein as by smooth hinge pins 58. This allows pivotal mounting for the cover 56 to afford free swinging movement inward or outward relative to the wall 55 indicating relative pressure inside and outside of the chamber 33. This cover as with the covers 25 and 26 permits adjustment of the gas pressure in chamber 33 to be balanced with the pressure in the open chamber 34.

The covers 56, 25, and 26 are always hinged on horizontally positioned axes and normally swing by the forces of gravity to a vertical position closing the openings. Pressure variations on opposite sides of a cover swing the cover against the force of gravity to allow the ambient gas to enter the chamber or gas to escape therefrom. The dampers shown could also have the form of an iris to permit adjustment and restrict the rate of gas flow to the blower and from the valve chambers.

Having thus described the invention with reference to the drawings showing the best modes of practicing my invention, what is claimed is:

1. A mixing valve for mixing two gaseous fluids in a desired proportion comprising means defining a pair of chambers each for containing a gaseous fluid, means defining an inlet opening into each said chamber allowing a gaseous fluid into each chamber, each said chamber being formed with an exit opening, with the exit opening in each chamber being equal in size to the opening in the other chamber, closure means disposed relative to said exit openings to fully close one opening and fully open the other and to be movable over the openings to proportionately vary the relative open area of each opening, means adapting the connection of the low-pressure side of a pump to said exit openings, and means for balancing the pressure of the gaseous fluid within said chambers with the ambient pressure around said chambers comprising a freely pivotal cover means positioned in an opening in a chamber wall of at least one chamber for indicating the relative pressure within said one chamber by its position with the chamber wall, said cover means closing said opening in the chamber wall when the pressure of the gas within said one chamber equals the ambient pressure.

2. A mixing valve according to claim 1 wherein said one chamber has means connected to the inlet opening for introducing a gaseous fluid under pressure into said one chamber to be mixed with a gaseous fluid in the other chamber as they are drawn from said chambers through said exit openings.

3. A mixing valve according to claim 1 wherein each chamber has cover means pivotally mounted in an opening in the chamber wall.

4. A mixing valve according to claim 1 wherein said closure means is rotatable over said exit openings for varying the open area of said openings to obtain a predetermined mixture.

5. A mixing valve according to claim 1 wherein said closure means is slidable to progressively close the exit opening in one chamber and simultaneously proportionally open the exit opening in the other chamber.

6. A mixing valve according to claim 1 comprising damper means for controlling the rate of fluid flow through said exit openings.

7. A mixing valve according to claim 6 wherein said damper means includes a movable disk controlled by manual operation to cover said exit openings and to be spaced therefrom for controlling the flow of gas through said openings.

8. A system for mixing two gases comprising a blower having an inlet and outlet port, a valve comprising wall means defining a plurality of chambers, each chamber having an inlet opening and each chamber having an exit opening, movable closure means disposed relative to said exit openings to fully close the exit opening in one chamber and fully open the exit opening in another chamber and to proportionately vary the open area of said exit openings, means connecting the inlet port of said blower to said exit openings to decrease the pressure on the side of said exit openings opposite said chambers, pressure-responsive means responsive to the pressure of the gas in one of said chambers for balancing the pressure of the gas in said one of said chambers with the pressure of the ambient gas pressure of said valve, said pressure-responsive means comprising means defining an opening in said wall means forming a normally vertical wall in one of said chambers, said opening communicating between said one of said chambers and the ambient atmosphere surrounding said valve, and a freely pivotal gravity controlled cover means, mounted in said opening to substantially fill said opening for allowing gas to enter or leave said one of said chambers when the pressure on one side of said cover means exceeds the pressure on the other side, and damper means between said blower inlet port and said valve for controlling the rate of flow of gas through said exit openings.

* * * * *